United States Patent [19]

Doi

[11] 4,239,364
[45] Dec. 16, 1980

[54] CAMERA BODY MOUNT

[75] Inventor: Kiyoshi Doi, Toyko, Japan

[73] Assignee: Alympus Optical Company, Ltd.

[21] Appl. No.: 953,368

[22] Filed: Oct. 23, 1978

[30] Foreign Application Priority Data

Oct. 24, 1977 [JP] Japan .............................. 52-142765

[51] Int. Cl.³ ........................ G02B 7/02; G03B 17/14
[52] U.S. Cl. .................................... 354/286; 350/252
[58] Field of Search ................ 354/286; 350/252–257

[56] References Cited

U.S. PATENT DOCUMENTS

| | | | |
|---|---|---|---|
| 1,129,523 | 2/1915 | Riglander | 350/252 |
| 2,284,847 | 6/1942 | Raymond | 350/257 |
| 2,496,928 | 2/1950 | Bing et al. | 350/252 |
| 2,808,762 | 10/1957 | De Grave | 350/252 |
| 3,070,389 | 12/1962 | Baur et al. | 350/257 |
| 3,758,198 | 9/1973 | Kanie et al. | 354/286 |
| 3,888,568 | 6/1975 | Norris | 350/252 |

FOREIGN PATENT DOCUMENTS 736926 of 1955 United Kingdom ..................... 354/288
980588 of 1965 United Kingdom ..................... 350/257

Primary Examiner—J. V. Truhe
Assistant Examiner—Shelley Wade
Attorney, Agent, or Firm—Brooks, Haidt, Haffner & Delahunty

[57] ABSTRACT

Bayonet-type attachment apparatus for coupling a lens or similar device to a camera wherein a one-piece, molded plastic annular camera body mount has tapered and resilient engagement claws which wedge, in the axial direction of the mount, between annularly parallel and oppositely facing engagement surfaces of the comating annular mount which is attached to the lens or similar device.

12 Claims, 8 Drawing Figures

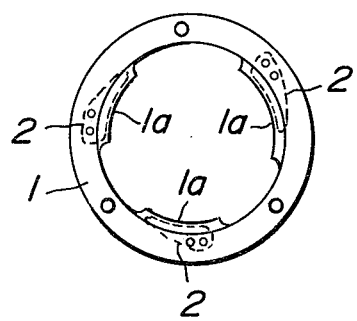
FIG._1 PRIOR ART
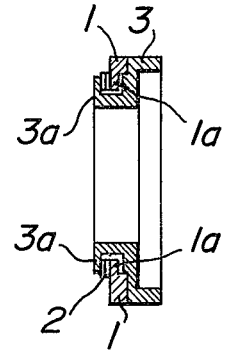
FIG._2 PRIOR ART
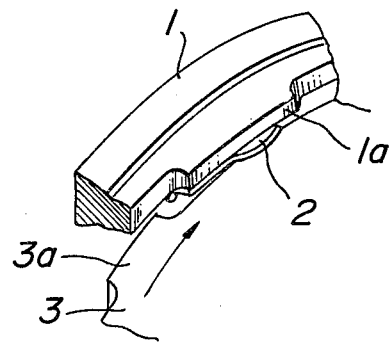
FIG._3 PRIOR ART
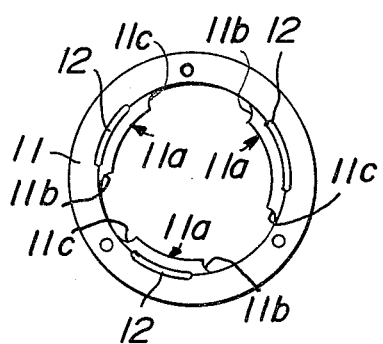
FIG._4
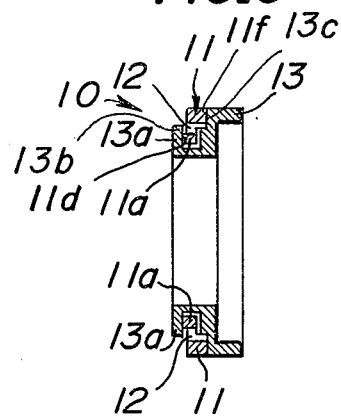
FIG._5
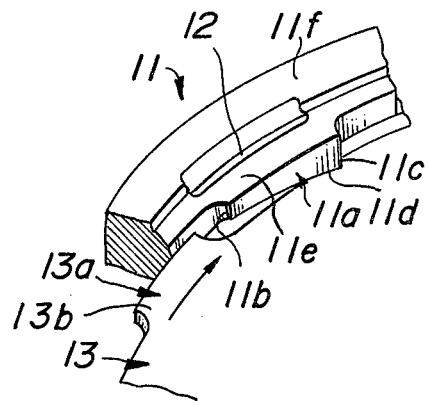
FIG._6

CAMERA BODY MOUNT

BACKGROUND OF THE INVENTION

The present invention relates to a bayonet type camera body mount for securing an inter-changeable lens to a camera body.

Recently, cameras tend to be lightened and cheapened, so that each part of a camera body is formed of molded plastic.

In this connection, a body mount for securing an inter-changeable lens should be molded by plastics, but plastics per se are poor in resilience or elasticity, so that coupling between the lens and the mount becomes loosened in use over a long period of time and the quality of the photography is deteriorated.

Therefore, as a bayonet type body mount heretofore, there has been proposed such type as shown in FIG. 1 in which a metallic mount spring 2 is secured to an engaging claw 1a of an annular body mount member 1, which is attached to a camera body (not shown). A comating annular mount 3 on the side of an interchangeable lens is faced in the manner shown in FIG. 3 and rotated in the direction of an arrow illustrated, and at that time, an engaging claw 3a of the lens mount 3 is engaged with the engaging claw 1a of the body mount 1 by resilient force caused by bending of the mount spring 2 as shown in FIG. 2.

According to such construction, however, another mount spring is required, and in addition thereto, additional works for assembling this spring are required, so that not only a number of parts but also working steps are increased and such construction is disadvantageous from the view of cost.

SUMMARY OF THE INVENTION

An object of the present invention is to eliminate the above described drawbacks.

Another object of the present invention is to provide a camera body mount which is integrally molded with an engaging claw and the engaging claw being formed into an elastic or resilient structure by plastic molding, thereby reducing a number of parts and assembling steps, so as to greatly contribute to make a camera light and cheap.

According to the present invention a camera body mount for attaching an interchangeable lens comprises an annular-shaped body mount member, and a plurality of engaging claws integrally formed with the body mount member, the engaging claws being formed into an elastic structure.

The body mount member and the engaging claws are integrally formed by plastic molding. Each engaging claw is provided with a through-hole at the base so as to directly give elasticity or resilience thereto.

BRIEF DESCRIPTION OF THE DRAWING

FIG. 1 is a plan view showing one embodiment of a conventional camera body mount;

FIG. 2 is a cross-sectional view of conventional attachment apparatus showing the state of coupling the lens mount to the body mount;

FIG. 3 is a fragmentary and enlarged perspective view showing the state of coupling the lens mount to the body mount in conventional apparatus;

FIG. 4 is a plan view showing one embodiment of a camera body mount according to the present invention;

FIG. 5 is a cross-sectional view of the attachment apparatus of the invention showing the state of coupling the lens mount to the body mount according to the present invention;

FIG. 6 is a fragmentary and enlarged perspective view showing the state of coupling the lens mount to the body mount according to the present invention.

DESCRIPTION OF THE PREFERRED EMBODIMENT

Figure 7:
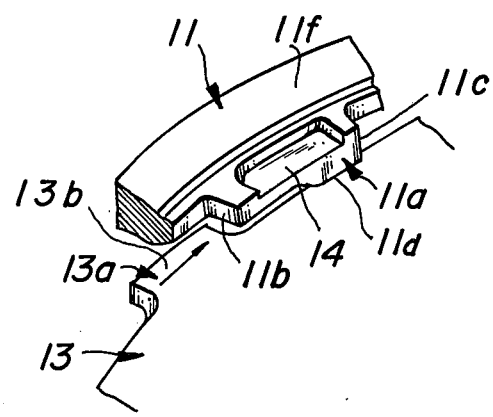
FIG. 7 and FIG. 8 are similar perspective views showing other embodiments of the camera body mount according to the present invention.

Referring now to FIGS. 4 to 8, wherein same reference characters designate same or corresponding parts throughout the several views, a camera body mount according to the present invention will be described.

Referring first to FIG. 5, attachment apparatus in accordance with the invention for coupling a lens or similar device (not shown) to a camera body (not shown) is generally indicated by reference numeral 10, and comprises a pair of bayonet-type, couplable mount elements generally indicated by numerals 11 and 13.

In FIG. 4, reference numeral 11 is an annular body mount formed in one piece by plastic molding. Along its inner periphery are integrally molded a plurality of radially inward projecting engaging claws 11a (3 pieces in the embodiment illustrated) which are annularly spaced from each other at equal intervals. Each engaging claw 11a is gradually made thick in axial direction, tapering from a narrow end 11b thereof to a wide end 11c thereof, as shown in FIG. 6, and is provided with a through-hole 12 at the base so as to impart resiliency to the engaging claw 11a in the axial direction of the mount 11.

In this case, a plastic material used for molding the body mount is Polysulfon (mixed with inorganic material) made by Union Carbide, nylon inorganic material mixture and the like.

In the presently preferred embodiment, and as shown in FIG. 6, only the side surface 11d of each claw is tapered in axial direction with respect to the opposite surface 11e thereof, the tapered surface 11d facing inwardly with respect to the camera body. Thus, as seen in FIGS. 5 and 6, the mount 11 has a first annular engagement surface 11f, which faces outwardly with respect to the camera body on which it is mounted, and a tapered, inwardly facing engagement surface 11d of each claw 11a, which surfaces become wedged between a pair of spaced apart and oppositely facing, annularly parallel engagement surfaces 13b, 13c of the comating mount 13 when the mount elements are coupled together.

In such attachment apparatus, a lens mount 13 on the side of an interchangeable lens is faced in the manner shown in FIG. 6, and in this state, the mount 13 is rotated in the direction of an arrow illustrated, and then, each annularly spaced apart engaging claw 11a of the body mount member 11, whose position is displaced radially inward with respect to the first annular engagement surface 11f of the claw, is bent by flexing in response to the rotation of the correspondingly spaced apart comating engaging claws 13a which project radially outward on, but are displaced radially inward with respect to the annular engagement surface 13c. of the mount 13. Each engaging claw 13a is engaged with the engaging claw 11a by this elastic force or resilience of the latter, as shown in FIG. 5, thereby coupling the lens mount 13 to the body mount member 11 in the hermetically sealed state by wedging of the camera body mount claw surfaces 11d and their engagement surfaces 11f between the annularly parallel lens mount surfaces 13b and 13c whose spacing distance in the axial direction of the mount is less than that between the camera body mount wedging surfaces 11d and 11f.

According to the present invention, each engaging claw is itself integrally molded with the body mount member by plastic molding and is formed so that the claw structure has elasticity, so that the number of parts can be reduced as compared with a conventional camera body mount which is particularly provided with a metallic spring for the purpose of obtaining elastic force. The number of assemblying steps can be reduced, and thus the camera becomes light in weight and cheap in cost.

Figure 8:
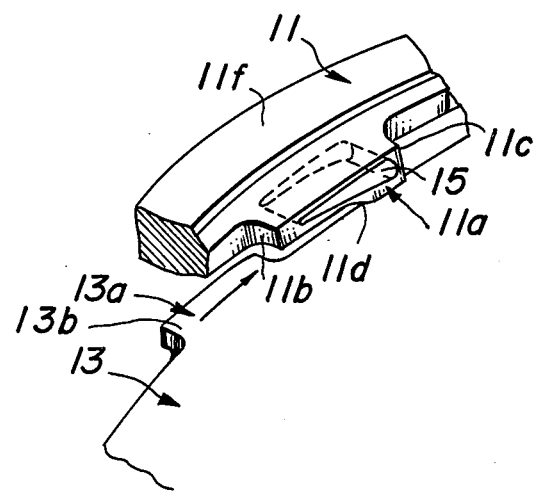

In addition, the present invention is not limited to the above embodiment but can optionally be modified without departing from the scope of the present invention. For instance, in the above described embodiment, each engaging claw 11a is provided with a recess in the form of the through-hole 12 for the purpose of giving resilience to the claw, but as shown in FIG. 7, it is preferable to form a recess portion 14 on the upper surface of each engaging claw 11a, or as shown in FIG. 8, each engaging claw 11a may be formed into a hollow shape 15 which is tapered to follow the shape of the claw.

What is claimed is:

1. Attachment apparatus for coupling a lens or similar device to a camera body, said attachment apparatus comprising a one-piece, annular-shaped camera body mount of resilient material adapted to be attached to said camera body, said annular body mount having a first annular surface for facing outwardly with respect to said camera body and a plurality of radially-inward projecting and annularly spaced apart engagement claws whose lengths extend in the annular direction of said body mount, each said body mount engagement claw having tapered configuration narrowing in the axial direction of said annular mount along its length from a wide end of the claw to a narrow end thereof and providing opposite surfaces of the claw for facing inwardly and outwardly with respect to said camera body, said opposite surfaces being displaced radially inward with respect to said first annular surface, and said tapered configurations of all of said claws being tapered in the same annular direction, and means defining an elongated, annularly extending recess associated with each of said engagement claws to enhance its resilience in the axial direction in the vicinity of the recess, and a comating annular mount adapted to be attached to said lens or similar device, said comating mount having a first annular surface for engaging said first annular surface of the body mount, and a plurality of radially outward projecting and annularly spaced apart engagement claws corresponding in number to said plurality of body mount engagement claws and whose respective lengths extend in the annular direction of the mount and correspond with the respectively associated annular spacing distances between said body mount claws to pass between the latter, each said claw of the comating mount providing a second but oppositely facing surface which is displaced radially inward and axially spaced from, and annularly parallel to said first annular surface of the comating mount for engaging one of said resilient body mount claws, the axial spacing distance between each of said second annular surfaces and said first annular surface of said comating mount being less than the axial distance between said first annular surface and said inwardly facing surfaces at said wide ends of the camera body mount claws, whereby said camera body mount and said comating mount are attached by wedging together accompanied by flexing of said resilient body mount claws in the axial direction of the mounts when said comating mount claws are passed between said camera body mount claws and engaged behind the latter by annular rotation of said comating mount with respect to said camera body mount with said first annular surfaces of said body mount and said comating mount in engagement with each other.

2. Apparatus according to claim 1 wherein only said inwardly facing surface of each said camera body mount claw is tapered, and said camera body mount first annular surface, said comating mount first annular surface, and all of said second annular surfaces of said claws of the comating mount are annularly parallel to each other.

3. Apparatus according to claim 1 wherein said recess associated with each said camera body mount engagement claw comprises an opening extending in the axial direction through the claw and annularly along a portion of the length thereof.

4. Apparatus according to claim 1 wherein said recess associated with each said camera body mount engagement claw comprises a depression formed in said outwardly facing surface of the claw and extending annularly along a portion of the length thereof.

5. Apparatus according to claim 1 wherein said recess associated with each said camera body mount engagement claw comprises an opening between said inwardly and outwardly facing surfaces of the claw and extending along a portion of the length of the claw.

6. Apparatus according to claim 5 wherein each of said recess openings is tapered in the same direction as said taper of the claw with which the opening is associated.

7. A one-piece, annular-shaped camera body mount of resilient material and having a first annular engagement surface facing in an outward direction and a plurality of radially-inward projecting and annularly spaced apart engagement claws whose lengths extend in the annular direction of said body mount, each said engagement claw having tapered configuration narrowing in axial direction along its length providing respective inwardly and outwardly facing surfaces thereof which are displaced radially inward with respect to said first annular engagement surface, said tapered configurations of all of said claws being tapered in the same annular direction, and means defining an elongated, annularly extending recess associated with each of said engagement claws to enhance the resilience of the claw in the axial direction in the vicinity of the recess.

8. A camera body mount according to claim 7 wherein said first annular engagement surface and said outwardly facing surfaces of each of said claws are annularly parallel to each other, and said inwardly facing surface of each of its said claws is tapered in axial direction with respect to said annularly parallel surfaces.

9. A camera body mount according to claim 8 wherein said recess associated with each said claw comprises an opening extending in the axial direction through the claw and annularly along a portion of the length thereof.

10. A camera body mount according to claim 8 wherein said recess associated with each said claw comprises a depression formed in said outwardly facing surface of the claw and extending annularly along a portion of the length thereof.

11. A camera body mount according to claim 8 wherein said recess associated with each said claw comprises an opening between said inwardly and outwardly facing surfaces of the claw and extending along a portion of the length of the claw.

12. A camera body mount according to claim 11 wherein each of said recess openings is tapered in the same direction as said taper of the claw with which the opening is associated.

* * * * *

UNITED STATES PATENT AND TRADEMARK OFFICE
CERTIFICATE OF CORRECTION

PATENT NO. : 4,239,364
DATED : December 16, 1980
INVENTOR(S) : Kiyoshi Doi

It is certified that error appears in the above-identified patent and that said Letters Patent are hereby corrected as shown below:

Name of Assignee should read -- Olympus Optical Company, Ltd. --;

Column 4, line 21 (claim 3), change "claim 1" to -- claim 2 --;
, line 26 (claim 4), change "claim 1" to -- claim 2 --;
, line 31 (claim 5), change "claim 1" to -- claim 2 --.

Signed and Sealed this

Seventh Day of April 1981

[SEAL]

Attest:

RENE D. TEGTMEYER

Attesting Officer     Acting Commissioner of Patents and Trademarks